US008489950B2

(12) United States Patent
Huang et al.

(10) Patent No.: US 8,489,950 B2
(45) Date of Patent: Jul. 16, 2013

(54) DISCONTINUOUS RECEPTION RETRANSMISSION TIMER AND METHOD

(75) Inventors: Min Huang, Beijing (CN); Yong Teng, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 1130 days.

(21) Appl. No.: 12/221,934

(22) Filed: Aug. 6, 2008

(65) Prior Publication Data

US 2010/0037114 A1 Feb. 11, 2010

(51) Int. Cl.
*G06F 11/00* (2006.01)

(52) U.S. Cl.
USPC ............................ 714/748; 714/749; 714/746

(58) Field of Classification Search
USPC .................................. 714/752, 755, 748, 749
See application file for complete search history.

(56) References Cited

U.S. PATENT DOCUMENTS

| | | | | |
|---|---|---|---|---|
| 7,916,675 | B2* | 3/2011 | Dalsgaard et al. | 370/311 |
| 8,045,513 | B2* | 10/2011 | Kim et al. | 370/329 |
| 2007/0177630 | A1* | 8/2007 | Ranta et al. | 370/473 |
| 2008/0186892 | A1* | 8/2008 | Damnjanovic | 370/311 |

OTHER PUBLICATIONS

Nokia Corporation et al: "Stage 3 Description of DRX" 3GPP Draft; R080021 Stage 3 Description of DRX, $3^{rd}$ Generation Partnership Project (3GPP), vol. RAN WG2, Jan. 14, 2008, XP050137924, Sevilla, Spain [retrieved on Jan. 8, 2008] Sections 3.2, 3.4, 5, 5.7.
Nokia Corporation et al: "Stage 3 Description of DRX" 3GPP Draft; R2-080552 Stage 3 Description of DRX V2, $3^{rd}$ Generation Partnership Project (3GPP), vol. RAN WG2, Jan. 14, 2008, XP050138387, Sevilla, Spain [retrieved on Jan. 25, 2008] Sections 3.2, 3.4, 5, 5.7.
Ericsson: "Handling of UL data in DRX" 3GPP Draft; R2-080935, $3^{rd}$ Generation Partnership Project (3GPP), vol. RAN WG2, Feb. 11, 2008, XP050138738, Sorrento, Italy [retrieved on Feb. 4, 2008] Section 5.7.
Research in Motion et al: "Some issues regarding DRX control" 3GPP Draft; R2-082465, $3^{rd}$ Generation Partnership Project (3GPP), vol. RAN WG2, May 5, 2008, XP050140149 Kansas City, USA [retrieved on Apr. 29, 2008] Section 5.7.
3GPP TS 36.300 V8.3.0 (Dec. 2007) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).
"HARQ Numbers of LTE TDD considering the proposal of special subframe", 3GPP TSG RAN WG1 #52 Meeting, R1-080958, Feb. 2008, 4 pgs.
"$3^{rd}$ Generation Partnership Project; Technical Specification Group Radio Access Network; Evolved Universal Terrestrial Radio Access (E-UTRA); Physical Channels and Modulation (Release 8)", 3GPP TS 36.211 V8.3.0, (May 2008), 77 pgs.
"$3^{rd}$ Generation Partnership Project; Technical Specification Group Radio Access Network; Evolved Universal Terrestrial Radio Access (E-UTRA) Medium Access Control (MAC) protocol specification (Release 8)", 3GPP TS 36.321 V8.2.0 (May 2008), 33 pgs.
"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.4.0 (Mar. 2008), 126 pgs.

* cited by examiner

*Primary Examiner* — Sarai Butler
(74) *Attorney, Agent, or Firm* — Harrington & Smith (57) ABSTRACT

A method includes, in response to a discontinuous reception (DRX) cycle being configured, and in response to a hybrid automatic repeat request round trip time (HARQ RTT) timer for an associated one of n hybrid automatic repeat request processes expiring in a current subframe when data in a corresponding hybrid automatic repeat request buffer is not successfully decoded, determining if a single discontinuous reception retransmission timer has been started. The single discontinuous reception retransmission timer is associated with all n of the hybrid automatic repeat request processes, where n is an integer equal to one or more than one. The method further includes, if the single discontinuous reception retransmission timer has not been started, starting the single discontinuous reception retransmission timer and setting an associated expiry value to a basic value. The method further includes, if the single discontinuous reception retransmission timer has been started, updating the expiry value by adding an increment value.

35 Claims, 9 Drawing Sheets

| UL/DL ALLOCATION | MAX DL HARQ ID* | AVERAGE HARQ RTT (ms)* |
|---|---|---|
| 1DL-3UL | 4 | 10 |
| 2DL-2UL | 7 | 11.67 |
| 3DL-1UL | 10 | 12.5 |
| 6DL-3UL | 9 | 12.8571 |
| 7DL-2UL | 12 | 15 |
| 8DL-1UL | 15 | 16.67 |
| 3DL-5UL | 6 | 12 |
| FDD | 8 | 8 |

FIG.1A

| UL/DL ALLOCATION | MAX DL HARQ ID* | AVERAGE HARQ RTT (ms)* |
|---|---|---|
| 1DL-3UL | 4 | 10 |
| 2DL-2UL | 7 | 11.67 |
| 3DL-1UL | 10 | 12.5 |
| 6DL-3UL | 9 | 12.8571 |
| 7DL-2UL | 12 | 15 |
| 8DL-1UL | 15 | 16.67 |
| 3DL-5UL | 6 | 12 |
| FDD | 8 | 8 |

DISCONTINUOUS RECEPTION RETRANSMISSION TIMER AND METHOD

TECHNICAL FIELD

The exemplary and non-limiting embodiments of this invention relate generally to wireless communication systems, methods, devices and computer programs and, more specifically, relate to communication between a mobile device and a network access node.

BACKGROUND

| | |
|---|---|
| 3GPP | third generation partnership project |
| UTRAN | universal terrestrial radio access network |
| EUTRAN | evolved UTRAN (LTE) |
| LTE | long term evolution |
| Node B | base station |
| eNB | EUTRAN Node B (evolved Node B) |
| UE | user equipment |
| UL | uplink (UE towards eNB) |
| DL | downlink (eNB towards UE) |
| DRX | discontinuous reception |
| EPC | evolved packet core |
| MME | mobility management entity |
| S-GW | serving gateway |
| MM | mobility management |
| PHY | physical |
| RLC | radio link control |
| RRC | radio resource control |
| MAC | medium access control |
| PDCP | packet data convergence protocol |
| O&M | operations and maintenance |
| FDD | frequency division duplex |
| TDD | time division duplex |
| HARQ | hybrid automatic repeat request |
| CQI | channel quality indicator |
| SRS | sounding reference signal |
| OFDMA | orthogonal frequency division multiple access |
| SC-FDMA | single carrier, frequency division multiple access |
| TTI | transmission time interval |
| RTT | round trip time |
| PDCCH | physical downlink control channel |

A communication system known as evolved UTRAN (EUTRAN, also referred to as UTRAN-LTE or as E-UTRA) is currently under development within the 3GPP. As presently specified the DL access technique will be OFDMA, and the UL access technique will be SC-FDMA.

One specification of interest is 3GPP TS 36.300, V8.3.0 (2007-12), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8), incorporated by reference herein in its entirety.

Figure 7:
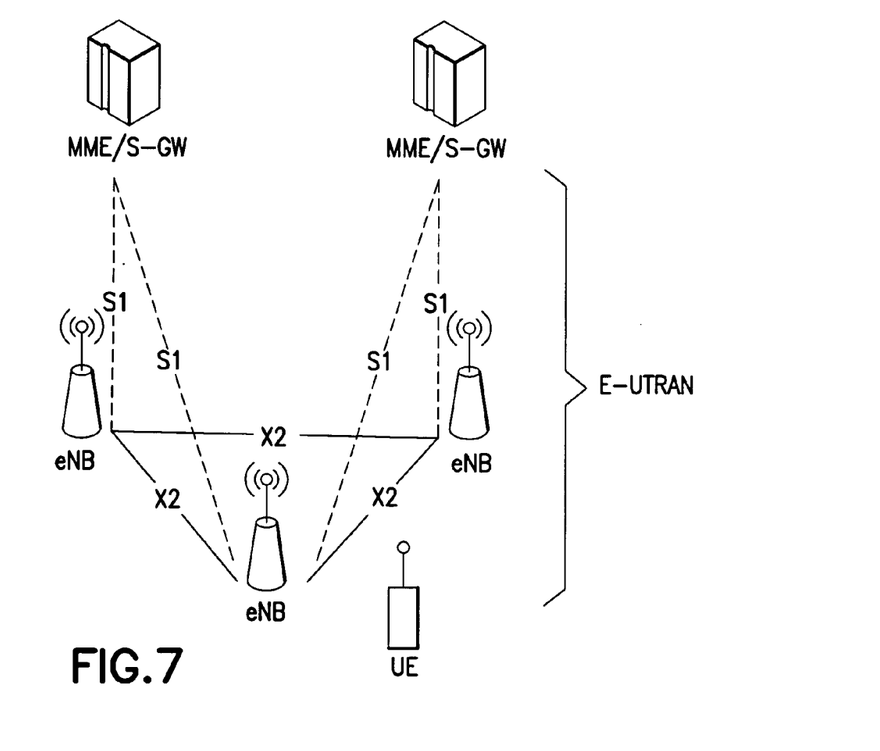
FIG. 7 reproduces FIG. 4 of 3GPP TS 36.300, and shows the overall architecture of the E-UTRAN system.

FIG. 7 reproduces FIG. 4 of 3GPP TS 36.300, and shows the overall architecture of the E-UTRAN system. The EUTRAN system includes eNBs, providing the EUTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of a S1MME interface and to a Serving Gateway (SGW) by means of a S1U interface. The S1 interface supports a many to many relationship between MMEs/Serving Gateways and eNBs.

The eNB hosts the following functions:
functions for Radio Resource Management: Radio Bearer Control, Radio Admission Control, Connection Mobility Control, Dynamic allocation of resources to UEs in both uplink and downlink (scheduling);
IP header compression and encryption of the user data stream;
selection of a MME at UE attachment;
routing of User Plane data towards the Serving Gateway;
scheduling and transmission of paging messages (originated from the MME);
scheduling and transmission of broadcast information (originated from the MME or O&M); and
measurement and measurement reporting configuration for mobility and scheduling.

Another document of more specific interest herein is 3GPP TS 36.321 V8.2.0 (2008-05) Technical Specification, 3rd Generation Partnership Project; Technical Specification Group Radio Access Network; Evolved Universal Terrestrial Radio Access (E-UTRA) Medium Access Control (MAC) protocol specification (Release 8), which is incorporated by reference in its entirety. Subclause 5.7, entitled Discontinuous Reception (DRX), states that the UE may be configured by RRC with a DRX functionality that allows it to not continuously monitor the PDCCH.

Another document of interest is 3GPP TSG RAN WG1 #52 Meeting, R1-080958, Sorrento, Italy, Feb. 11-15, 2008, "HARQ Numbers of LTE TDD considering the proposal of special subframe", Nokia, Nokia Siemens Networks, which is also incorporated by reference herein.

As is specified in 3GPP TS 36.321, the DRX functionality consists of a Long DRX cycle, a DRX Inactivity Timer, a DRX Retransmission Timer and optionally a Short DRX Cycle and a DRX Short Cycle Timer, all defined in Subclause 3.1.

When a DRX cycle is configured, the Active Time includes the time while:
  the On Duration Timer or the DRX Inactivity Timer or a DRX Retransmission Timer or the Contention Resolution Timer is running; or
  a Scheduling Request is pending (as described in subclause 5.4.4); or
  an uplink grant for a retransmission can occur; or
  a PDCCH indicating a new transmission addressed to the C-RNTI or Temporary C-RNTI of the UE has not been received after successful reception of a Random Access Response (as described in subclause 5.1.4).

When a DRX cycle is configured, the UE shall for each subframe:
  start the On Duration Timer when [(SFN*10)+subframe number] modulo (current DRX Cycle)=DRX Start Offset;
  if a HARQ RTT Timer expires in this subframe and the data in the soft buffer of the corresponding HARQ process was not successfully decoded:
    start the DRX Retransmission Timer for the corresponding HARQ process.
  if a DRX Command MAC control element is received:
    stop the On Duration Timer;
    stop the DRX Inactivity Timer.
  if the DRX Inactivity Timer expires or a DRX Command MAC control element is received in this subframe:
    if the short DRX cycle is configured:
      start the DRX Short Cycle Timer and use the Short DRX Cycle.

else:
  use the Long DRX cycle.
  if the DRX Short Cycle Timer expires in this subframe:
  use the long DRX cycle.
   during the Active Time, for a PDCCH-subframe except if the subframe is required for uplink transmission for half-duplex FDD UE operation:
   monitor the PDCCH;
   if the PDCCH indicates a DL transmission:
    start the HARQ RTT Timer for the corresponding HARQ process;
    stop the DRX Retransmission Timer for the corresponding HARQ process.
   if the PDCCH indicates a new transmission (DL or UL):
   start or restart the DRX Inactivity Timer.
   if a DL assignment has been configured for this subframe and no PDCCH indicating a DL transmission was successfully decoded:
    start the HARQ RTT Timer for the corresponding HARQ process.
   when not in active time, CQI and SRS shall not be reported.
  Regardless of whether the UE is monitoring PDCCH or is not monitoring the PDCCH it receives and transmits HARQ feedback when such is expected.

It is noted that the concept of the DRX Retransmission Timer is related to the operation of a HARQ process by way of a HARQ RTT Timer.

That is, the DRX Retransmission Timer specifies the maximum number of consecutive PDCCH subframe(s) during which a DL retransmission is expected by the UE, while the HARQ RTT Timer specifies a minimum number of subframe(s) before a DL HARQ retransmission is expected by the UE.

The joint operation of the DRX Retransmission Timer and the HARQ RTT Timer, in the case of a new transmission, is currently specified as was described above.

Certain rules for a downlink HARQ process are that at most one HARQ process is configured to one UE in one DL subframe, and one HARQ RTT Timer and one DRX Retransmission Timer per DL HARQ process, when DRX is active, are configured.

Figure 1A:
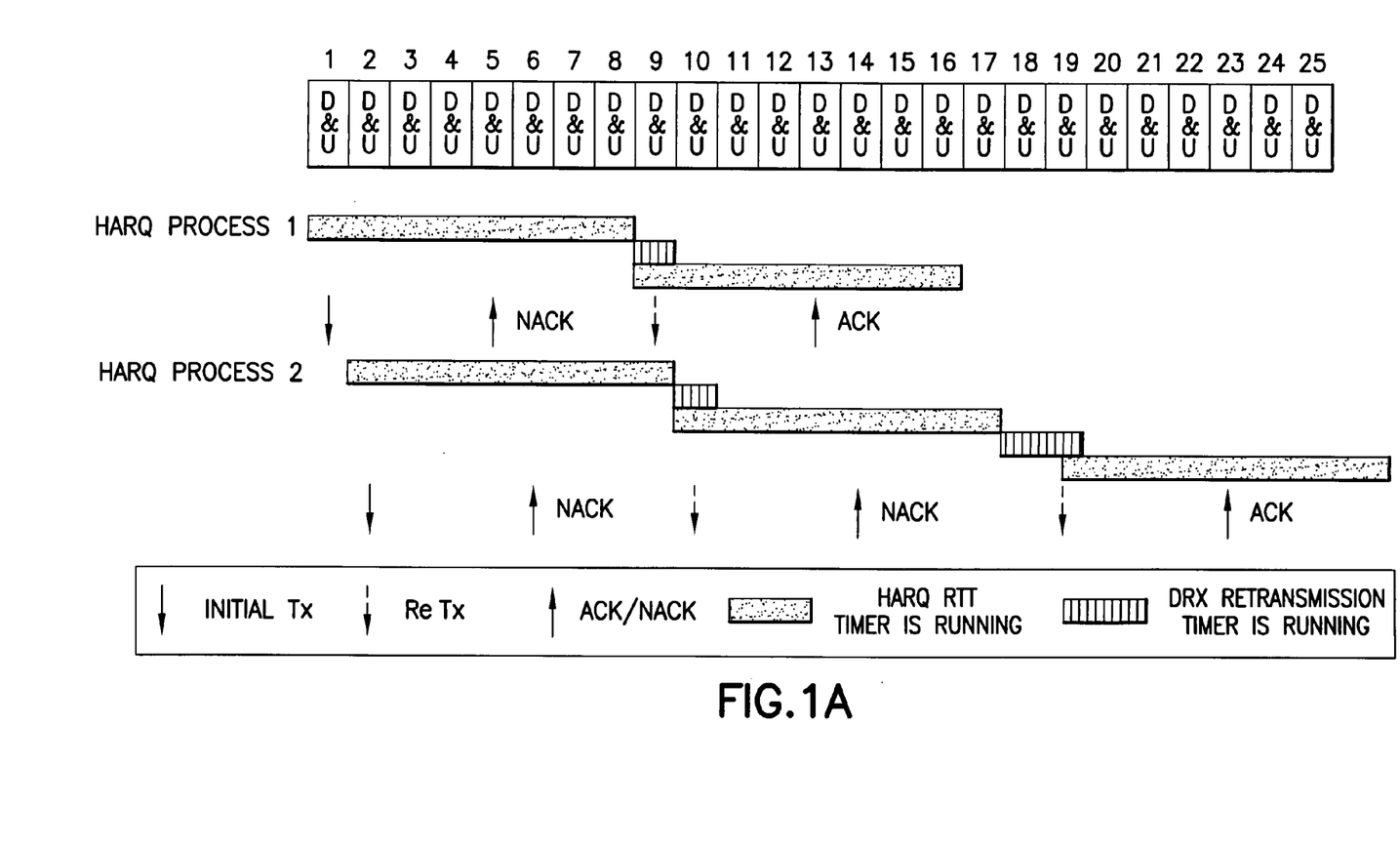
FIG. 1A shows joint operation of a HARQ RTT Timer and a DRX Retransmission Timer in LTE FDD.

Since there are both DL and UL transmissions in each subframe in FDD, it can be specified that the HARQ RTT Timer is always 8 TTIs in FDD, as shown in FIG. 1A. Due to the characteristics of FDD it may be concluded that HARQ processes which begin at different subframes are independent, as there is no collision of the starting points of the DRX Retransmission Timer.

Figure 1B:
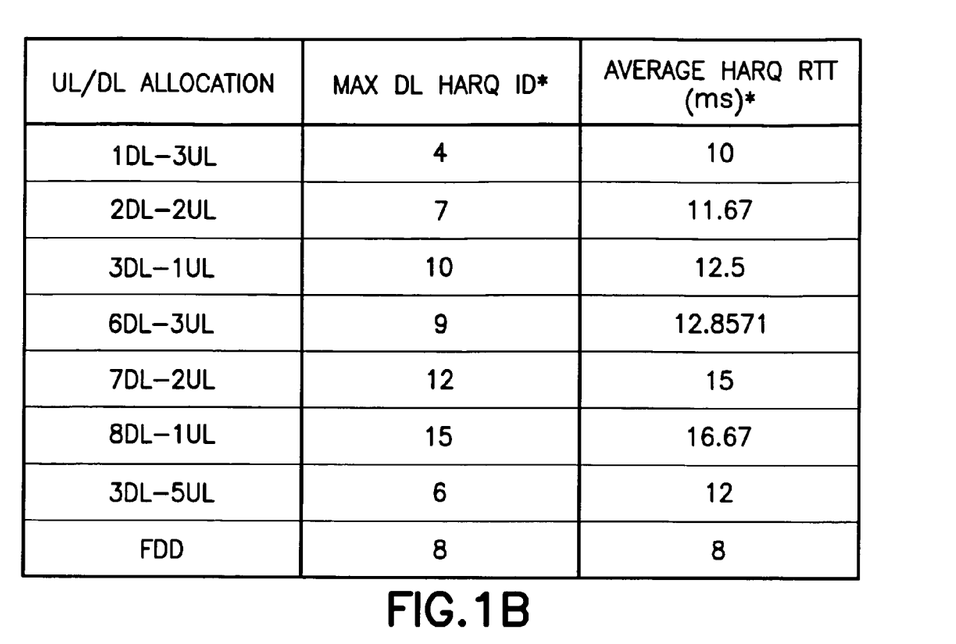
FIG. 1B is a table showing a number of DL HARQ channels and the averaged RTT over all channels in LTE TDD.

Discussing now is a problem that arises in the TDD mode. Since there is either a DL or an UL transmission in each subframe in TDD (not both as in the case of the FDD mode), the RTT values of the HARQ process beginning at each subframe in one frame are different. Reference in this regard can be made to the Table shown in FIG. 1B, which is reproduced from the above-referenced R1-080958 document.

Figure 2:
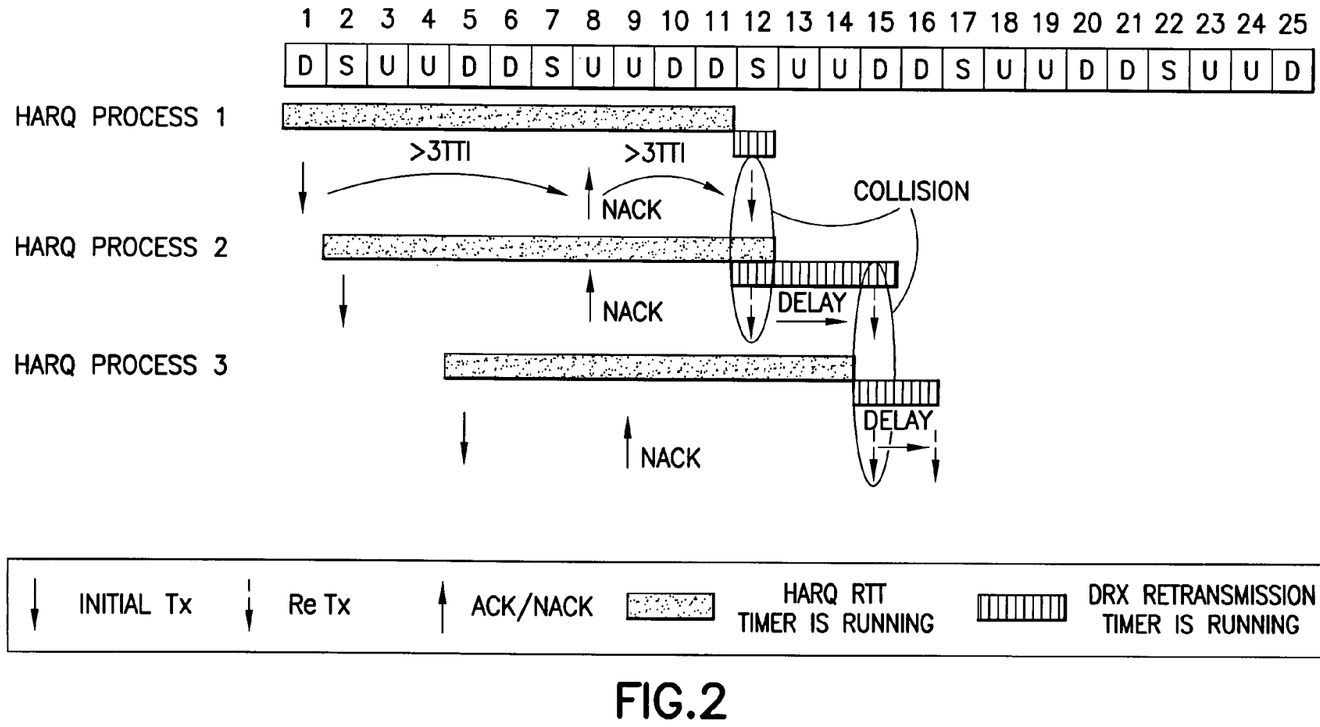
FIG. 2 depicts the joint operation of the HARQ RTT Timer and DRX Retransmission Timer in LTE TDD for a case of 2DL+1S+2UL.

Under the present operational rules the start of retransmission of different HARQ processes can potentially collide in a DL subframe. FIG. 2 shows an example of a 2DL+1S+2UL configuration. In FIG. 2 D represents a DL subframe, U represents an UL subframe, and S represents a special subframe.

General reference with regard to UL, DL and S subframes for the TDD mode can be made to Subclause 4.2, Frame structure type 2, of 3GPP TS 36.211 V8.3.0 (2008-05) Technical Specification, 3rd Generation Partnership Project; Technical Specification Group Radio Access Network; Evolved Universal Terrestrial Radio Access (E-UTRA); Physical Channels and Modulation (Release 8), incorporated by reference herein in its entirety.

It can be observed in FIG. 2 that without HARQ process 1, the retransmission of HARQ process 2 can begin in subframe 12, while with HARQ process 1, the retransmission of HARQ process 2 may be delayed to subframe 15. Accordingly, with HARQ process 2, the retransmission of HARQ process 3 may be delayed to subframe 16.

Figure 3:
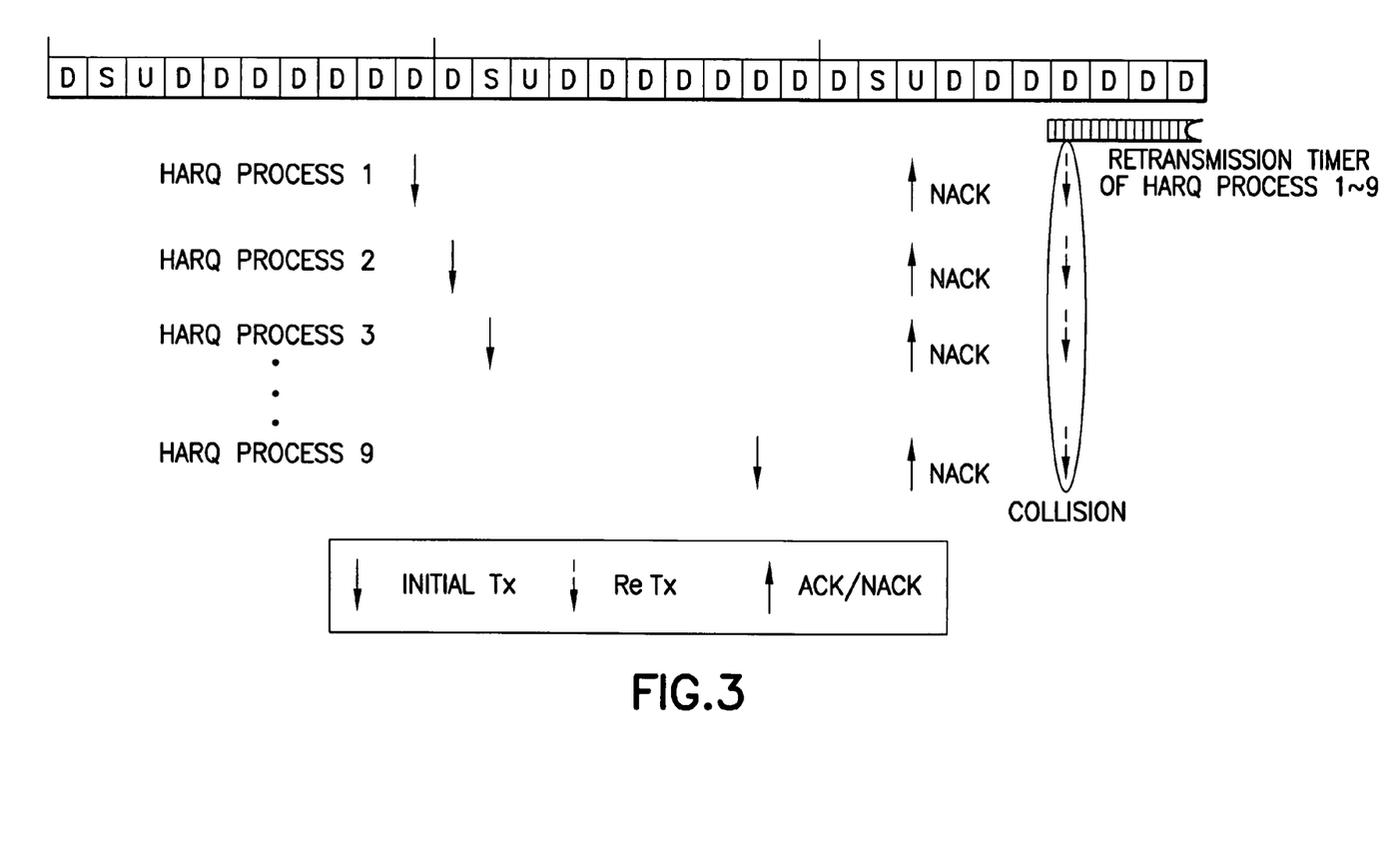
FIG. 3 depicts retransmission collisions in LTE TDD for a case of 8DL+1S+1UL.

A more extreme configuration, 8DL+1S+1UL, is depicted in FIG. 3. In this case up to 9 HARQ processes may collide. As a result, problems can arise in designing a DRX Retransmission Timer and HARQ RTT Timer for each process. For example, if the DRX Retransmission Timer expiry value is made small, such as 2 DL subframes, the window for monitoring the PDCCH is not sufficient when most or all possible HARQ processes exist. Further, if the DRX Retransmission Timer expiry value is made large, such as 9 DL subframes, the effect of power saving is reduced in the case where only a few HARQ processes exist (e.g., only processes 1 and 9). Further still, if the HARQ RTT Timer value is set according to the maximum RTT among all subframes, the delay is increased for those subframes whose RTT is small in the case where only a few HARQ processes exist.

SUMMARY

The foregoing and other problems are overcome, and other advantages are realized, by the use of the exemplary embodiments of this invention.

In a first aspect thereof the exemplary embodiments of this invention provide a method that includes, in response to a discontinuous reception cycle being configured, and in response to a hybrid automatic repeat request round trip time timer for an associated one of n hybrid automatic repeat request processes expiring in a current subframe when data in a corresponding hybrid automatic repeat request buffer is not successfully decoded, determining if a single discontinuous reception retransmission timer has been started. The single discontinuous reception retransmission timer is associated with all n of the hybrid automatic repeat request processes, where n is an integer equal to one or more than one. The method further includes, if the single discontinuous reception retransmission timer has not been started, starting the single discontinuous reception retransmission timer and setting an associated expiry value to a basic value. The method further includes, if the single discontinuous reception retransmission timer has been started, updating the expiry value by adding an increment value.

In another aspect thereof the exemplary embodiments of this invention provide an apparatus that comprises a controller configured with a wireless receiver. The controller is responsive to a discontinuous reception cycle being configured, and to a hybrid automatic repeat request round trip time timer for an associated one of n hybrid automatic repeat request processes expiring in a current subframe, when data in a corresponding hybrid automatic repeat request buffer is not successfully decoded, to determine if a single discontinuous reception retransmission timer has been started. The single discontinuous reception retransmission timer is associated with all n of the hybrid automatic repeat request processes, where n is an integer equal to one or more than one. The controller is further configured, if the single discontinuous reception retransmission timer has not been started, to start the single discontinuous reception retransmission timer and to set an associated expiry value to a basic value, and if the single discontinuous reception retransmission timer has been started, to update the expiry value by adding an increment value.

In another aspect thereof the exemplary embodiments of this invention provide a computer readable memory medium that stores program instructions. The execution of the program instructions result in operations that comprise, in response to a discontinuous reception cycle being configured, and in response to a hybrid automatic repeat request round trip time timer for an associated one of n hybrid automatic repeat request processes expiring in a current subframe when data in a corresponding hybrid automatic repeat request buffer is not successfully decoded, determining if a single discontinuous reception retransmission timer has been started. The single discontinuous reception retransmission timer is associated with all n of the hybrid automatic repeat request processes, where n is an integer equal to one or more than one. If the single discontinuous reception retransmission timer has not been started, there is a further operation of starting the single discontinuous reception retransmission timer and setting an associated expiry value to a basic value. If the single discontinuous reception retransmission timer has been started, there is a further operation of updating the expiry value by adding an increment value.

In a still further aspect thereof the exemplary embodiments of this invention provide an apparatus that comprises means for determining if a single discontinuous reception retransmission timer has been started, the single discontinuous reception retransmission timer being associated with all n of the hybrid automatic repeat request processes, where n is an integer equal to one or more than one. The determining means operates in response to a discontinuous reception cycle being configured, and in response to a hybrid automatic repeat request round trip time timer for an associated one of n hybrid automatic repeat request processes expiring in a current subframe when data in a corresponding hybrid automatic repeat request buffer is not successfully decoded. The apparatus further comprises means, responsive to a condition where the single discontinuous reception retransmission timer has not been started, for starting the single discontinuous reception retransmission timer and setting an associated expiry value to a basic value, and further responsive to a condition where the single discontinuous reception retransmission timer has been started, for updating the expiry value by adding an increment value. The apparatus also comprises means for monitoring a downlink control channel during an active time and, if the downlink control channel indicates a downlink transmission, for starting a hybrid automatic repeat request round trip time timer for a corresponding hybrid automatic repeat request process and, if all downlink hybrid automatic repeat request processes that wait for retransmission signalling have been indicated in the downlink control channel, for stopping the single discontinuous reception retransmission timer.

DETAILED DESCRIPTION

The exemplary embodiments of this invention relate generally to LTE, and more specifically relate to the operation of the TDD mode, and even more specifically to the specification and operation of the retransmission timer used during operation in the DTX mode.

In view of the discussion in the Background section, it should be appreciated that the application of the present rules concerning the DRX Retransmission Timer to the TDD mode, i.e., where the DRX Retransmission Timer is set for HARQ processes individually, the collision probability at the start of HARQ processes is increased. The potential ways to address this problem, however, can result in either an insufficient retransmission window or reduced power saving. To solve this problem the exemplary embodiments of this invention instead provide in one aspect thereof a single, adaptive DRX Retransmission Timer for all HARQ processes.

Figure 8:
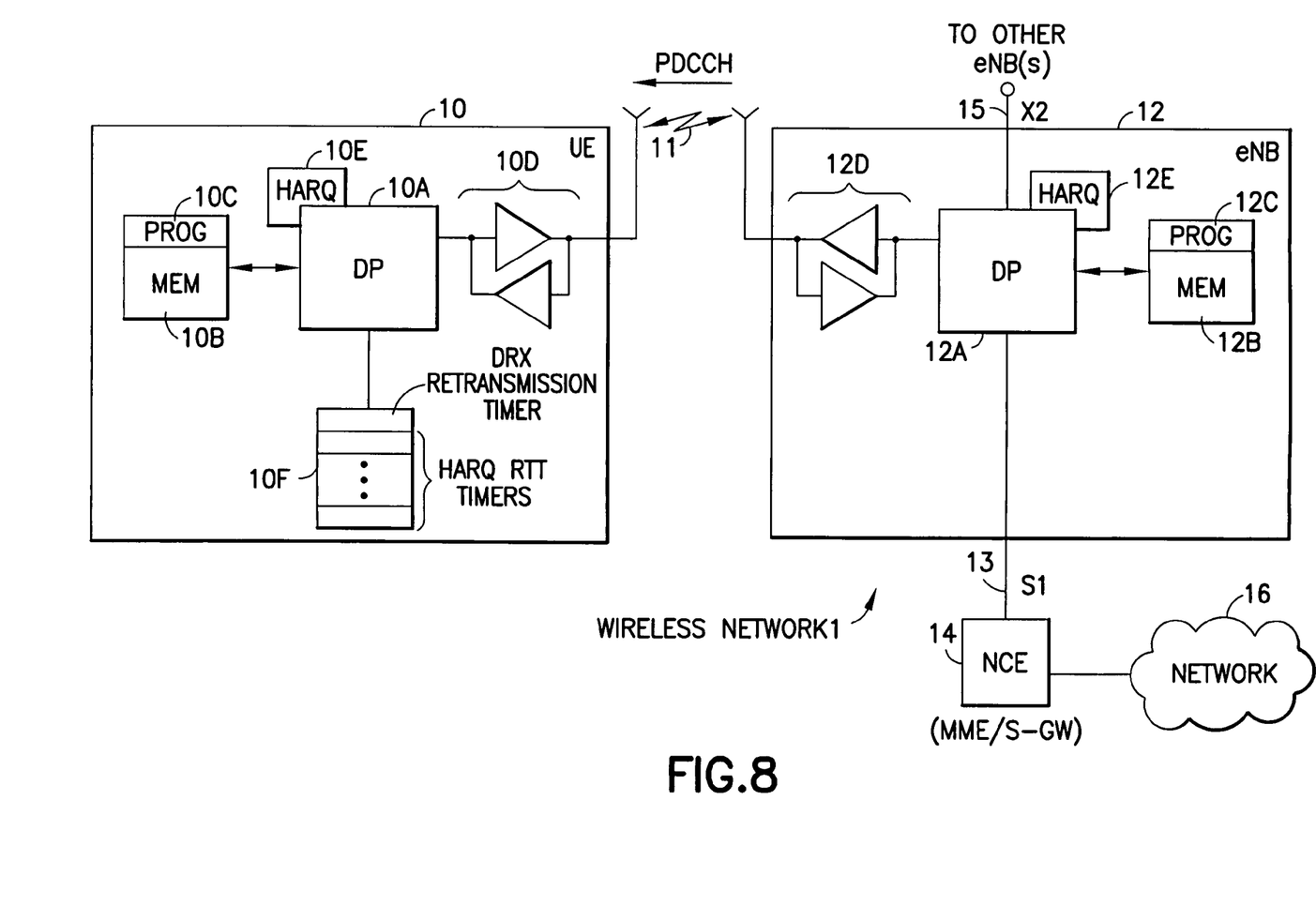
FIG. 8 shows a simplified block diagram of various electronic devices that are suitable for use in practicing the exemplary embodiments of this invention.

Before describing in further detail the exemplary embodiments of this invention, reference is made to FIG. 8 for illustrating a simplified block diagram of various electronic devices and apparatus that are suitable for use in practicing the exemplary embodiments of this invention. In FIG. 8 a wireless network 1 is adapted for communication with an apparatus, which may be embodied as or as a part of a mobile communication device which may be referred to as a UE 10, via a network access node, such as a Node B (base station), and more specifically an eNB 12. The network 1 may include a network control element (NCE) 14 that may include the MME/S-GW functionality shown in FIG. 7, and which provides connectivity with a network 16, such as a telephone network and/or a data communications network (e.g., the internet). The UE 10 includes at least one computer, which may also be referred to as a data processor (DP) 10A, at least one computer readable medium that is embodied as a memory (MEM) 10B that stores program instructions (PROG) 10C, and at least one suitable radio frequency (RF) transceiver (transmitter/receiver) 10D for bidirectional wireless communications 11 with the eNB 12 via one or more antennas. The eNB 12 also includes at least one computer, which may also be referred to as a DP 12A, at least one computer readable medium that is embodied as a MEM 12B that stores program instructions as PROG 12C, and at least one suitable RF transceiver 12D that uses one or more antennas. The eNB 12 is coupled via a data/control path 13 to the NCE 14. The path 13 may be implemented as the S1 interface shown in FIG. 7. At least the PROG 10C is assumed to include program instructions that, when executed by the associated DP 10A, enable the electronic device to operate in accordance with the exemplary embodiments of this invention, as will be discussed below in greater detail.

That is, the exemplary embodiments of this invention may be implemented at least in part by computer software executable by the DP 10A of the UE 10, or by hardware (including one or more integrated circuits), or by a combination of software and hardware (and firmware).

For the purposes of describing the exemplary embodiments of this invention the UE 10 may be assumed to also include a HARQ function 10E and an associated plurality of timers 10F, where one of the timers 10F is a single DRX Retransmission Timer (in accordance with the exemplary embodiments of this invention) and where others of the timers 10F are HARQ RTT timers (one being allocated for each HARQ process). The eNB 12 also includes a HARQ function 12E.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multicore processor architecture, as non-limiting examples.

Described now is a uniform and adaptive DRX Retransmission Timer design in accordance with the exemplary embodiments of this invention.

In accordance with these exemplary embodiments a single DRX Retransmission Timer is used for all HARQ processes, as opposed to individual timers for each HARQ process. The single DRX Retransmission Timer may be configured with a basic value (BV) and an optional increment value (IV) by, for example, RRC signaling in cooperation with the eNB 12. The parameter IV may be set to a default value of 1 DL subframe.

The value of the single DRX Retransmission Timer is denoted as T, where T>0 indicates the DRX Retransmission Timer is running and the UE 10 is required to monitor the PDCCH. During operation the value of T increments with each PDCCH subframe occurrence. An expiry value (EV) is defined such that if T exceeds EV, the operation of the uniform DRX Retransmission Timer is stopped.

The expiry value EV of the uniform DRX Retransmission Timer is adaptive with the expiration of the HARQ RTT Timer of HARQ processes, as follows:

In every PDCCH subframe:
Operation 1 (basic): if DRX Retransmission Timer has been started and has not expired, it increments until it equals EV,
if $0 < T \leq EV$,
   T=T+1;
else if T=EV+1,
   T=0, EV=0;
end if.
Operation 2: once one or multiple (assume the number is n) HARQ RTT Timers expire,
if the single DRX Retransmission Timer has not been started (i.e., T=0),
   start the single DRX Retransmission Timer, i.e., T=1, and initialize the expiry value, i.e., EV=BV+IV*(n−1);
else (i.e., T>0),
   update the expiry value, i.e., EV=EV+IV*n;
end if
if the PDCCH has indicated all of the DL HARQ processes that wait for retransmission signaling:
stop DRX Retransmission Timer, i.e., T=0, EV=0.
end if.

It can be noted that a variable is used at the UE 10 to count the number of DL HARQ processes that wait for retransmission signalling. It can also be noted that the HARQ RTT Timers for all the HARQ processes can remain as presently specified. That is, each HARQ process has its own HARQ RTT Timer whose duration length is pre-defined according to the subframe index of DL transmission.

It should also be noted that this multiple HARQ RTT Timers and single DRX Retransmission Timer mode, in accordance with these exemplary embodiments, can be generally applied to all TDD configurations, and it may also be applied in the FDD mode. In general, there is no change in effect from the present multiple HARQ RTT Timers and multiple DRX Retransmission Timer mode.

Figure 4:
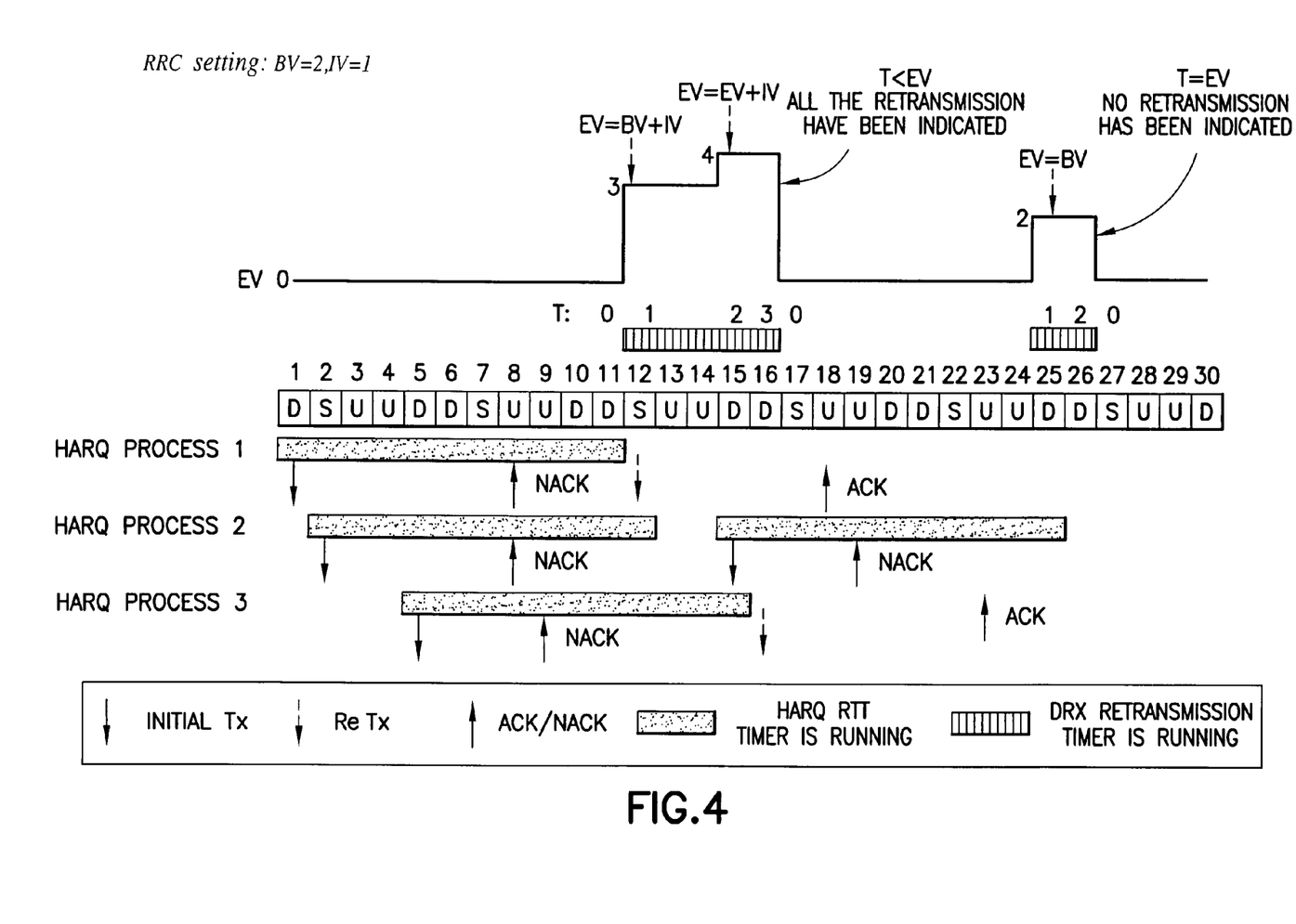
FIG. 4 shows an example of the use of a uniform and adaptive DRX Retransmission Timer in the LTE TDD mode (2DL+1S+2UL), in accordance with the exemplary embodiments of this invention.
Figure 5:
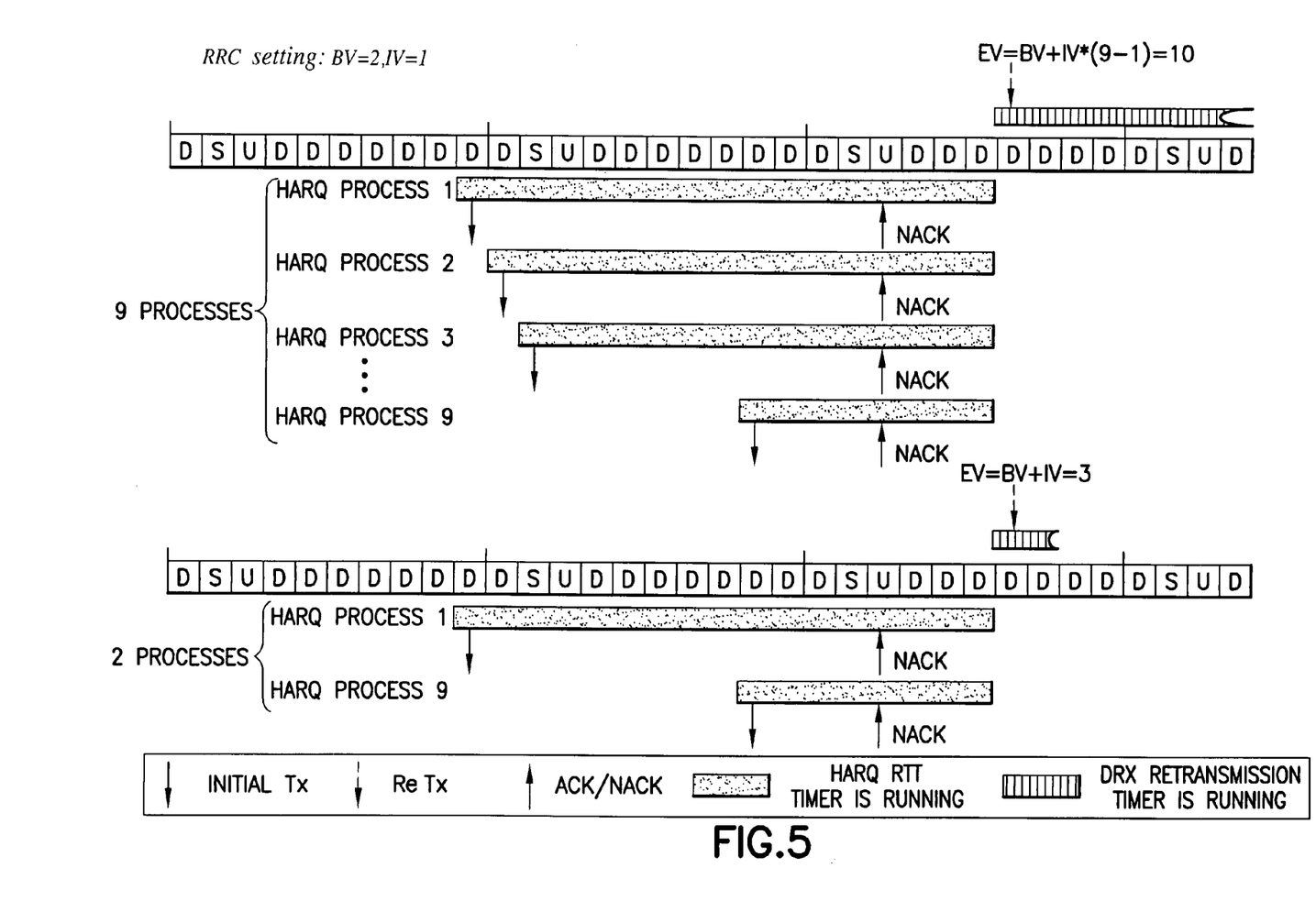
FIG. 5 shows an example of the use of the uniform and adaptive DRX Retransmission Timer in the LTE TDD mode (8DL+1S+1UL), in accordance with the exemplary embodiments of this invention.

FIG. 4 and FIG. 5 show examples of the use of the uniform and adaptive DRX Retransmission Timer (the multiple HARQ RTT Timers and single DRX Retransmission Timer mode) in the LTE TDD mode. FIG. 4 shows the exemplary case of 2DL+1S+2UL and depicts the joint operation of multiple HARQ RTT Timers and the one uniform DRX Retransmission Timer for an exemplary 3 HARQ processes. FIG. 5 shows the exemplary case of 8DL+1S+1UL and depicts operation in scenarios with different HARQ process configurations (9 HARQ processes and 2 HARQ processes). Note that in this case the value of EV changes with the number of HARQ processes.

The use of these exemplary embodiments of the invention is advantageous for a number of reasons in the DRX procedure in LTE. For example, in the TDD mode it provides enhanced power savings while satisfying the requirements of PDCCH monitoring for all configurations and numbers of HARQ processes, without increasing the retransmission delay. The use of these exemplary embodiments of the invention is also advantageous in that there is a reduction in implementation complexity through the use of one uniform DRX Retransmission Timer, as opposed to the use of multiple individual timers. Further by example, in the FDD mode these exemplary embodiments are operable without any change in the basic operation, while still providing the benefit of the use of one DRX Retransmission Timer instead of multiple individual timers.

Figure 6:
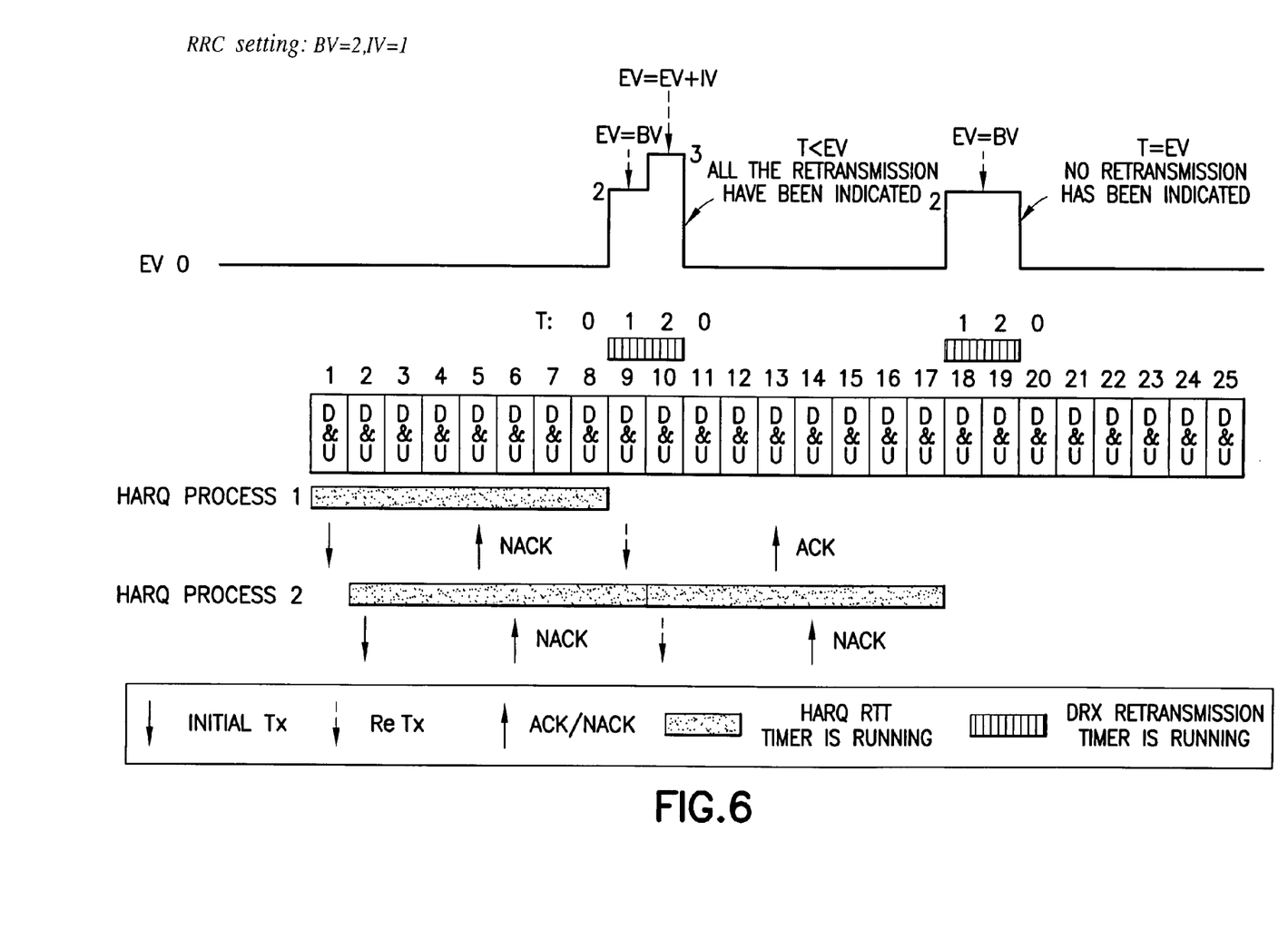
FIG. 6 shows an example of the use of the uniform and adaptive DRX Retransmission Timer in the LTE FDD mode, further in accordance with the exemplary embodiments of this invention.

FIG. 6 is an example of the use of the single DRX Retransmission Timer in the FDD mode with an exemplary 2 HARQ processes.

Thus, the use of these exemplary embodiments of the invention solves the problems that arise when operating in the TDD mode, while still being compatible with operation in the FDD mode.

Based on the foregoing it should be apparent that the exemplary embodiments of this invention provide a method, apparatus and computer program(s) to enhance DTX operation of the UE 10.

Figure 9:
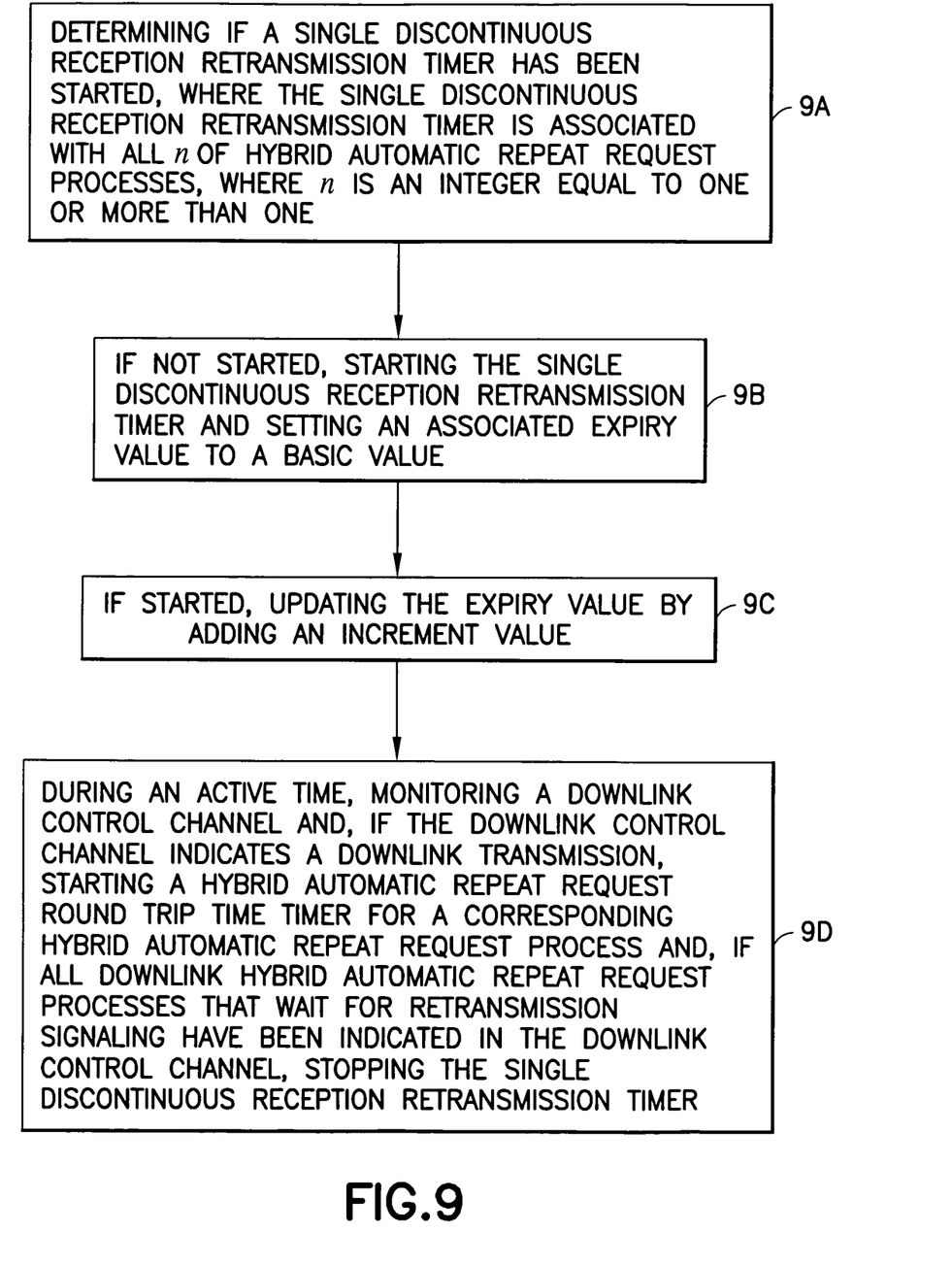
FIG. 9 is a logic flow diagram that illustrates the operation of a method, and a result of execution of computer program instructions, in accordance with the exemplary embodiments of this invention.

Referring to FIG. 9, a method includes, in response to a discontinuous reception cycle being configured, and in response to a hybrid automatic repeat request round trip time timer for an associated one of n hybrid automatic repeat request processes expiring in a current subframe when data in a corresponding hybrid automatic repeat request buffer is not successfully decoded, (Block 9A) determining if a single discontinuous reception retransmission timer has been started. The single discontinuous reception retransmission timer being associated with all n of the hybrid automatic repeat request processes, where n is an integer equal to one or more than one. If the single discontinuous reception retransmission timer has not been started, the method includes (Block 9B) starting the single discontinuous reception retransmission timer and setting an associated expiry value to a basic value. If the single discontinuous reception retransmission timer has been started, the method includes (Block 9C) updating the expiry value by adding an increment value.

The method of the preceding paragraph further including, during an active time, (Block 9D) monitoring a downlink control channel and, if the downlink control channel indicates a downlink transmission, starting a hybrid automatic repeat request round trip time timer for a corresponding hybrid automatic repeat request process and, if all downlink hybrid automatic repeat request processes that wait for retransmission signaling have been indicated in the downlink control channel, stopping the single discontinuous reception retransmission timer.

The method of the preceding paragraphs, where the increment value has a default value of 1 downlink subframe.

The method of the preceding paragraphs, where a value of the single discontinuous reception retransmission timer is denoted as T, where T>0 indicates the single discontinuous reception retransmission timer is running and that the downlink control channel should be monitored.

The method of the preceding paragraph, further comprising incrementing T for each occurrence of a subframe of the downlink control channel, and stopping the single discontinuous reception retransmission timer if T> the expiry value.

The method of the preceding paragraphs, where when T=0 the expiry value is set to be equal to the basic value plus an increment amount which is related to both the increment value and the value n−1, while if T>0 the expiry value is updated by adding the expiry value to an increment amount which is related to both the increment value and the value n.

The method of the preceding paragraphs, performed by a user equipment in one of a time division duplex mode of operation of a wireless communication system or a frequency division duplex mode of operation of the wireless communication system.

The various blocks shown in FIG. 9 may be viewed as method steps, and/or as operations that result from operation of computer program code, and/or as a plurality of coupled circuit elements constructed to carry out the associated function(s) and to implement various corresponding means.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

At least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the EUTRAN (UTRAN LTE) system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., BV, IV, EV, etc.) are not intended to be limiting in any respect, as these parameters may be identified by any suitable names. Further, the names assigned to different timers (DRX Retransmission Timer, HARQ RTT Timer) and channels (e.g., PDCCH) are not intended to be limiting in any respect, as these various timers and channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   in response to a discontinuous reception cycle being configured, and in response to a hybrid automatic repeat request round trip time timer for an associated one of n hybrid automatic repeat request processes expiring in a current subframe when data in a corresponding hybrid automatic repeat request buffer is not successfully decoded, determining if a single discontinuous reception retransmission timer has been started, the single discontinuous reception retransmission timer being associated with all n of the hybrid automatic repeat request processes, where n is an integer greater than one;
   if the single discontinuous reception retransmission timer has not been started, starting the single discontinuous reception retransmission timer and setting an associated expiry timer value to a basic value; and
   if the single discontinuous reception retransmission timer has been started, automatically updating the expiry timer value by adding an increment value to at least reduce probability of collision among different ones of the n hybrid automatic repeat request processes.

2. The method of claim 1, further comprising:
   during an active time, monitoring a downlink control channel and, if the downlink control channel indicates a downlink transmission, starting a hybrid automatic repeat request round trip time timer for a corresponding hybrid automatic repeat request process; and
   if all downlink hybrid automatic repeat request processes that wait for retransmission signaling have been indicated in the downlink control channel, stopping the single discontinuous reception retransmission timer.

3. The method of claim 1, where the increment value has a default value of 1 downlink subframe.

4. The method of claim 2, where a value of the single discontinuous reception retransmission timer is denoted as T, where T>0 indicates the single discontinuous reception retransmission timer is running and that the downlink control channel should be monitored.

5. The method of claim 4, further comprising incrementing T for each occurrence of a subframe of the downlink control channel, and stopping the single discontinuous reception retransmission timer if T> the expiry timer value.

6. The method of claim 4, where when T=0 the expiry timer value is set to be equal to the basic value plus an increment amount which is related to both the increment value and the value (n−1), while if T>0 the expiry timer value is updated by adding the expiry timer value to an increment amount which is related to both the increment value and the value n.

7. The method of claim 1, performed in a time division duplex mode of operation of a wireless communication system.

8. The method of claim 1, performed in a frequency division duplex mode of operation of a wireless communication system.

9. The method of claim 1, performed in a user equipment that is wirelessly coupled to a base station.

10. An apparatus, comprising:
    a controller configured with a wireless receiver, said controller being responsive to a discontinuous reception cycle being configured and to a hybrid automatic repeat request round trip time timer for an associated one of n hybrid automatic repeat request processes expiring in a current subframe, when data in a corresponding hybrid automatic repeat request buffer is not successfully decoded, to determine if a single discontinuous reception retransmission timer has been started, the single discontinuous reception retransmission timer being associated with all n of the hybrid automatic repeat request processes, where n is an integer greater than one, said controller being further configured, if the single discontinuous reception retransmission timer has not been started, to start the single discontinuous reception retransmission timer and to set an associated expiry timer value to a basic value, and if the single discontinuous reception retransmission timer has been started, to automatically update the expiry timer value by adding an increment value to at least reduce probability of collision among different ones of the n hybrid automatic repeat request processes.

11. The apparatus of claim 10, said controller being further configured during an active time to monitor a downlink control channel and, if the downlink control channel indicates a downlink transmission, to start a hybrid automatic repeat request round trip time timer for a corresponding hybrid automatic repeat request process and, if all downlink hybrid automatic repeat request processes that wait for retransmission signaling have been indicated in the downlink control channel, to stop the single discontinuous reception retransmission timer.

12. The apparatus of claim 10, where the increment value has a default value of 1 downlink subframe.

13. The apparatus of claim 11, where a value of the single discontinuous reception retransmission timer is denoted as T, where T>0 indicates the single discontinuous reception retransmission timer is running and that the downlink control channel should be monitored.

14. The apparatus of claim 13, said controller being further configured to increment T for each occurrence of a subframe of the downlink control channel, and to stop the single discontinuous reception retransmission timer if T > the expiry timer value.

15. The apparatus of claim 13, where when T=0 the expiry timer value is set to be equal to the basic value plus an increment amount which is related to both the increment value and the value (n−1), while if T>0 the expiry timer value is updated by adding the expiry timer value to an increment amount which is related to both the increment value and the value n.

16. The apparatus of claim 10, operating in a time division duplex mode of operation of a wireless communication system.

17. The apparatus of claim 10, operating in a frequency division duplex mode of operation of a wireless communication system.

18. The apparatus of claim 10, embodied in a user equipment where said receiver is configured to receive transmissions from a base station.

19. A non-transitory computer readable memory medium that stores program instructions, the execution of the program instructions resulting in operations that comprise:
    in response to a discontinuous reception cycle being configured, and in response to a hybrid automatic repeat request round trip time timer for an associated one of n hybrid automatic repeat request processes expiring in a current subframe when data in a corresponding hybrid automatic repeat request buffer is not successfully decoded, determining if a single discontinuous reception retransmission timer has been started, the single discontinuous reception retransmission timer being associated with all n of the hybrid automatic repeat request processes, where n is an integer greater than one;
    if the single discontinuous reception retransmission timer has not been started, starting the single discontinuous reception retransmission timer and setting an associated expiry timer value to a basic value; and if the single discontinuous reception retransmission timer has been started, automatically updating the expiry timer value by adding an increment value to at least reduce probability of collision among different ones of the n hybrid automatic repeat request processes.

20. The computer readable memory medium of claim 19, further comprising operations of:

during an active time, monitoring a downlink control channel and, if the downlink control channel indicates a downlink transmission, starting a hybrid automatic repeat request round trip time timer for a corresponding hybrid automatic repeat request process; and if all downlink hybrid automatic repeat request processes that wait for retransmission signaling have been indicated in the downlink control channel, stopping the single discontinuous reception retransmission timer.

21. The computer readable memory medium of claim 19, where the increment value has a default value of 1 downlink subframe.

22. The computer readable memory medium of claim 20, where a value of the single discontinuous reception retransmission timer is denoted as T, where T>0 indicates the single discontinuous reception retransmission timer is running and that the downlink control channel should be monitored.

23. The computer readable memory medium of claim 22, further comprising operations of incrementing T for each occurrence of a subframe of the downlink control channel, and stopping the single discontinuous reception retransmission timer if T > the expiry timer value.

24. The computer readable memory medium of claim 22, where when T=0 the expiry timer value is set to be equal to the basic value plus an increment amount which is related to both the increment value and the value (n−1), while if T>0 the expiry timer value is updated by adding the expiry timer value to an increment amount which is related to both the increment value and the value n.

25. The computer readable memory medium of claim 19, said operations being performed in a time division duplex mode of operation of a wireless communication system.

26. The computer readable memory medium of claim 19, said operations being performed in a frequency division duplex mode of operation of a wireless communication system.

27. The computer readable memory medium of claim 19, embodied in a user equipment configurable to be wirelessly coupled to a base station.

28. An apparatus, comprising:

means for determining if a single discontinuous reception retransmission timer has been started, the single discontinuous reception retransmission timer being associated with all n of the hybrid automatic repeat request processes, where n is an integer greater than one, said determining means operating in response to a discontinuous reception cycle being configured, and in response to a hybrid automatic repeat request round trip time timer for an associated one of n hybrid automatic repeat request processes expiring in a current subframe when data in a corresponding hybrid automatic repeat request buffer is not successfully decoded;

means, responsive to a condition where the single discontinuous reception retransmission timer has not been started, for starting the single discontinuous reception retransmission timer and setting an associated expiry timer value to a basic value, and further responsive to a condition where the single discontinuous reception retransmission timer has been started, for automatically updating the expiry timer value by adding an increment value to at least reduce probability of collision among different ones of the n hybrid automatic repeat request processes; and means for monitoring a downlink control channel during an active time and, if the downlink control channel indicates a downlink transmission, for starting a hybrid automatic repeat request round trip time timer for a corresponding hybrid automatic repeat request process and, if all downlink hybrid automatic repeat request processes that wait for retransmission signaling have been indicated in the downlink control channel, for stopping the single discontinuous reception retransmission timer.

29. The apparatus of claim 28, where the increment value has a default value of 1 downlink subframe.

30. The apparatus of claim 28, where a value of the single discontinuous reception retransmission timer is denoted as T, where T>0 indicates the single discontinuous reception retransmission timer is running and that the downlink control channel should be monitored, and further comprising means for incrementing T for each occurrence of a subframe of the downlink control channel, and for stopping the single discontinuous reception retransmission timer if T > the expiry timer value.

31. The apparatus of claim 30, further comprising means responsive to T=0 for setting the expiry timer value to be equal to the basic value plus an increment amount which is related to both the increment value and the value (n−1), and to T>0 for updating the expiry value by adding the expiry timer value to an increment amount which is related to both the increment value and the value n.

32. The apparatus of claim 28, embodied in a user equipment that operates in a time division duplex mode of operation of a wireless communication system.

33. The apparatus of claim 28, embodied in a user equipment that operates in a frequency division duplex mode of operation of a wireless communication system.

34. The apparatus of claim 28, where said control channel is a physical downlink control channel.

35. The apparatus of claim 28, embodied at least partially as at least one integrated circuit.

\* \* \* \* \*